United States Patent
van Tooren et al.

(10) Patent No.: US 12,485,624 B2
(45) Date of Patent: *Dec. 2, 2025

(54) METHOD AND APPARATUS FOR JOINING THERMOPLASTIC COMPOSITE COMPONENTS

(71) Applicant: Rohr, Inc., Chula Vista, CA (US)

(72) Inventors: Michael van Tooren, San Diego, CA (US); Milan Mitrovic, Del Mar, CA (US)

(73) Assignee: Rohr, Inc., Chula Vista, CA (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/224,983

(22) Filed: Jul. 21, 2023

(65) Prior Publication Data

US 2025/0026084 A1   Jan. 23, 2025

(51) Int. Cl.
*B29C 65/38* (2006.01)
*B29C 65/00* (2006.01)
*B29C 65/32* (2006.01)

(52) U.S. Cl.
CPC .............. *B29C 65/38* (2013.01); *B29C 65/32* (2013.01); *B29C 66/131* (2013.01); *B29C 66/721* (2013.01); *B29C 66/73116* (2013.01); *B29C 66/9221* (2013.01); *B29C 66/9241* (2013.01)

(58) Field of Classification Search
CPC ......... B29C 65/38; B29C 65/32; B29C 65/36; B29C 66/131; B29C 66/721; B29C 66/73116; B29C 66/9221; B29C 66/9241
See application file for complete search history.

(56) References Cited

U.S. PATENT DOCUMENTS

| | | |
|---|---|---|
| 5,500,511 A | 3/1996 | Hansen |
| 5,624,594 A | 4/1997 | Matsen |
| 2016/0136879 A1 | 5/2016 | Matsen |
| 2016/0167290 A1* | 6/2016 | Esser .................... B29C 66/723 425/500 |
| 2020/0223153 A1 | 7/2020 | Gilbert |
| 2020/0276769 A1* | 9/2020 | Van Ingen ........ B29C 66/81831 |

(Continued)

OTHER PUBLICATIONS

EP Search Report for EP Patent Application No. 24189770.1 dated Nov. 4, 2024.

*Primary Examiner* — George R Koch
(74) *Attorney, Agent, or Firm* — Getz Balich LLC

(57) ABSTRACT

A method of blind welding thermoplastic composite components is provided. The method includes providing a first and second thermoplastic composite components each having a bonding surface. The first thermoplastic composite component has a first melting temperature and the second thermoplastic composite component has a second melting temperature; providing an interface layer having a third melting temperature; disposing the interface layer between the bonding surfaces; disposing an external susceptor adjacent to the outer surface of the first thermoplastic composite component, wherein the external susceptor includes a central segment and lateral segments that respond differently to an application of an EM field; applying a normal force to the first component external susceptor without an application of an opposing second normal force to the second thermoplastic component; and applying an electromagnetic field to the central and lateral segments using an inductor.

19 Claims, 8 Drawing Sheets

(56) References Cited

U.S. PATENT DOCUMENTS

| | | | |
|---|---|---|---|
| 2022/0258847 A1 | 8/2022 | Labordus | |
| 2023/0211569 A1* | 7/2023 | Mitrovic | B29C 65/3644 |
| | | | 156/273.9 |
| 2023/0356320 A1* | 11/2023 | Frogner | B29C 65/3676 |
| 2023/0398748 A1* | 12/2023 | Dando | B29C 66/1122 |
| 2025/0026083 A1* | 1/2025 | van Tooren | B29C 66/8322 |

* cited by examiner

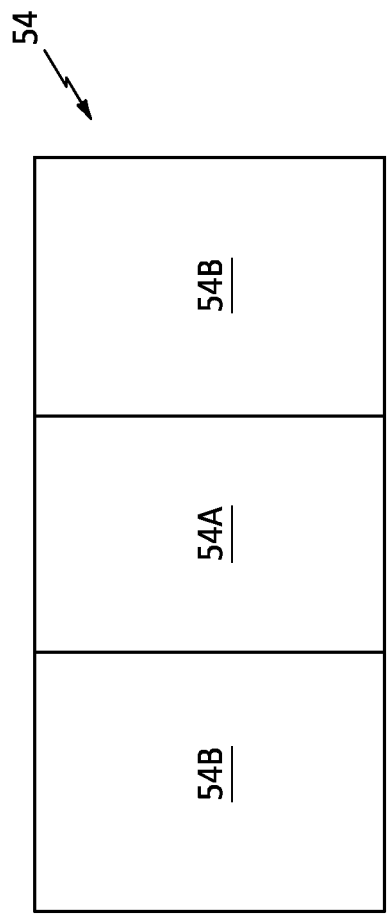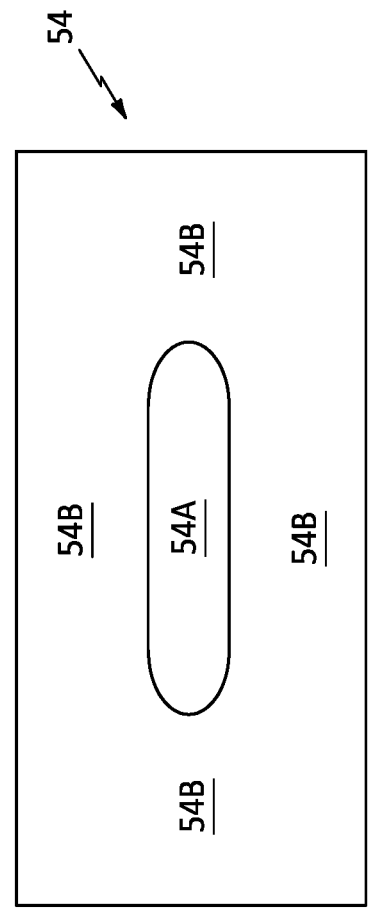

METHOD AND APPARATUS FOR JOINING THERMOPLASTIC COMPOSITE COMPONENTS

BACKGROUND OF THE INVENTION

1. Technical Field

The present disclosure relates to methods and apparatus for joining thermoplastic composite components together in general, and to methods and apparatus for welding thermoplastic composite components in particular.

2. Background Information

Current techniques for welding thermoplastic composite components typically utilize force applied to opposite sides of the components being joined to create a weld path and material collapse therein. In many instances, it is not possible to apply opposing force to the components to be joined—a scenario sometimes referred to as a "blind weld". In these instances, controlling the weld pool can be difficult and the probability of component collapse and/or excessive component deformation is increased. What is needed is a method and/or system that can be used to facilitate blind welds.

SUMMARY

According to an aspect of the present disclosure, a method of blind welding thermoplastic composite components is provided. The method includes providing a first thermoplastic composite (FTPC) component having a thickness that extends between an outer surface and an opposite FTPC bonding surface, the first thermoplastic composite component having a first melting temperature; providing a second thermoplastic composite (STPC) component having a STPC bonding surface, the second thermoplastic composite component having a second melting temperature; providing an interface layer comprising a thermoplastic material, the interface layer having a third melting temperature; disposing the interface layer between the FTPC bonding surface and the STPC bonding surface, such that the FTPC bonding surface is contiguous with the interface layer, and the STPC bonding surface is contiguous with the interface layer; disposing an external susceptor adjacent to the outer surface of the first thermoplastic composite component, wherein the external susceptor includes a central segment and a plurality of lateral segments contiguous with the central segment, wherein the central segment and the plurality of lateral segments are configured to respond differently to an application of an EM field; applying a normal force to the outer surface of the first thermoplastic composite component without an application of an opposing second normal force to the second thermoplastic component; and applying an electromagnetic field to the central segment and the plurality of lateral segments using an inductor, wherein the central segment and the plurality of lateral segments are configured such that the electromagnetic field heats the central segment to the first melting temperature or above, and heats the lateral segments to a temperature below first melting temperature, and the electromagnetic filed is applied until a region of the first thermoplastic composite component aligned with the central segment is at or above the first melting temperature, the interface layer is at or above the third melting temperature, and at least a portion of the second thermoplastic composite component is at or above the second melting temperature.

In any of the aspects or embodiments described above and herein, the method may include removing the application of the electromagnetic field after the first thermoplastic composite component aligned with the central segment is at or above the first melting temperature, the interface layer is at or above the third melting temperature, and the at least a portion of the second thermoplastic composite component is at or above the second melting temperature.

In any of the aspects or embodiments described above and herein, the interface layer may be a unitary body configured to occupy substantially all of a bond region between the first thermoplastic composite and the second thermoplastic composite.

In any of the aspects or embodiments described above and herein, the interface layer may occupy substantially all of a bond region between the first thermoplastic composite and the second thermoplastic composite subsequent to a weld pool creation.

In any of the aspects or embodiments described above and herein, the thermoplastic material of the interface layer may be homogenous.

In any of the aspects or embodiments described above and herein, the interface layer may include a fibrous material distributed in a matrix of said thermoplastic material.

In any of the aspects or embodiments described above and herein, the interface layer may include a plurality of independent segments configured to collectively occupy substantially all of a bond region between the first thermoplastic composite and the second thermoplastic composite.

In any of the aspects or embodiments described above and herein, the external susceptor may have a planar configuration.

In any of the aspects or embodiments described above and herein, the plurality of lateral segments may include a first lateral segment and a second lateral segment, and the central segment is disposed between the first lateral segment and the second lateral segment.

In any of the aspects or embodiments described above and herein, the first lateral segment may be attached to the central segment, and the second lateral segment may be attached to the central segment.

In any of the aspects or embodiments described above and herein, the second thermoplastic composite component may include a first region contiguous with a bonding surface and a second region contiguous with a surface opposite the bonding surface, and the first region may have the second melting temperature, and the second region may have a fourth melting temperature higher than the second melting temperature.

In any of the aspects or embodiments described above and herein, the second thermoplastic composite component may include an isolation region disposed between the first region and the second region, and the isolation region may be configured to be more thermally insulative than the first region.

In any of the aspects or embodiments described above and herein, the normal force may be directly applied to the outer surface of the first thermoplastic composite component.

In any of the aspects or embodiments described above and herein, the normal force may be applied to the external susceptor.

In any of the aspects or embodiments described above and herein, the inductor may be used to apply the normal force.

According to an aspect of the present disclosure, a method of welding a first thermoplastic composite component to a second thermoplastic composite component is provided. The first thermoplastic composite (FTPC) component has a thickness that extends between an outer surface and an opposite FTPC bonding surface, and the second thermoplastic composite (STPC) component has a STPC bonding surface. The interface layer is disposed between the FTPC bonding surface and the STPC bonding surface. The method includes: disposing an external susceptor adjacent to the outer surface of the first thermoplastic composite component; applying a normal force to the outer surface of the first thermoplastic composite component without an application of an opposing second normal force to the second thermoplastic component; applying an electromagnetic field to the external susceptor while the normal force is applied, the applied electromagnetic field configured to create a weld pool that encompasses a portion of the first thermoplastic composite component, a portion of the second thermoplastic composite component, and the interface layer; determining a first inflection point of the applied normal force, a second inflection point of the applied normal force, wherein the applied normal force decreases between the first inflection point and the second inflection point, and a third inflection point whereafter the applied normal force becomes substantially constant; and removing the applied electromagnetic field to permit the weld pool to solidify upon determining the third inflection point.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 9 diagrammatically illustrates a present disclosure external susceptor embodiment.

FIG. 9A diagrammatically illustrates a present disclosure external susceptor embodiment.

DETAILED DESCRIPTION

Figure 1:
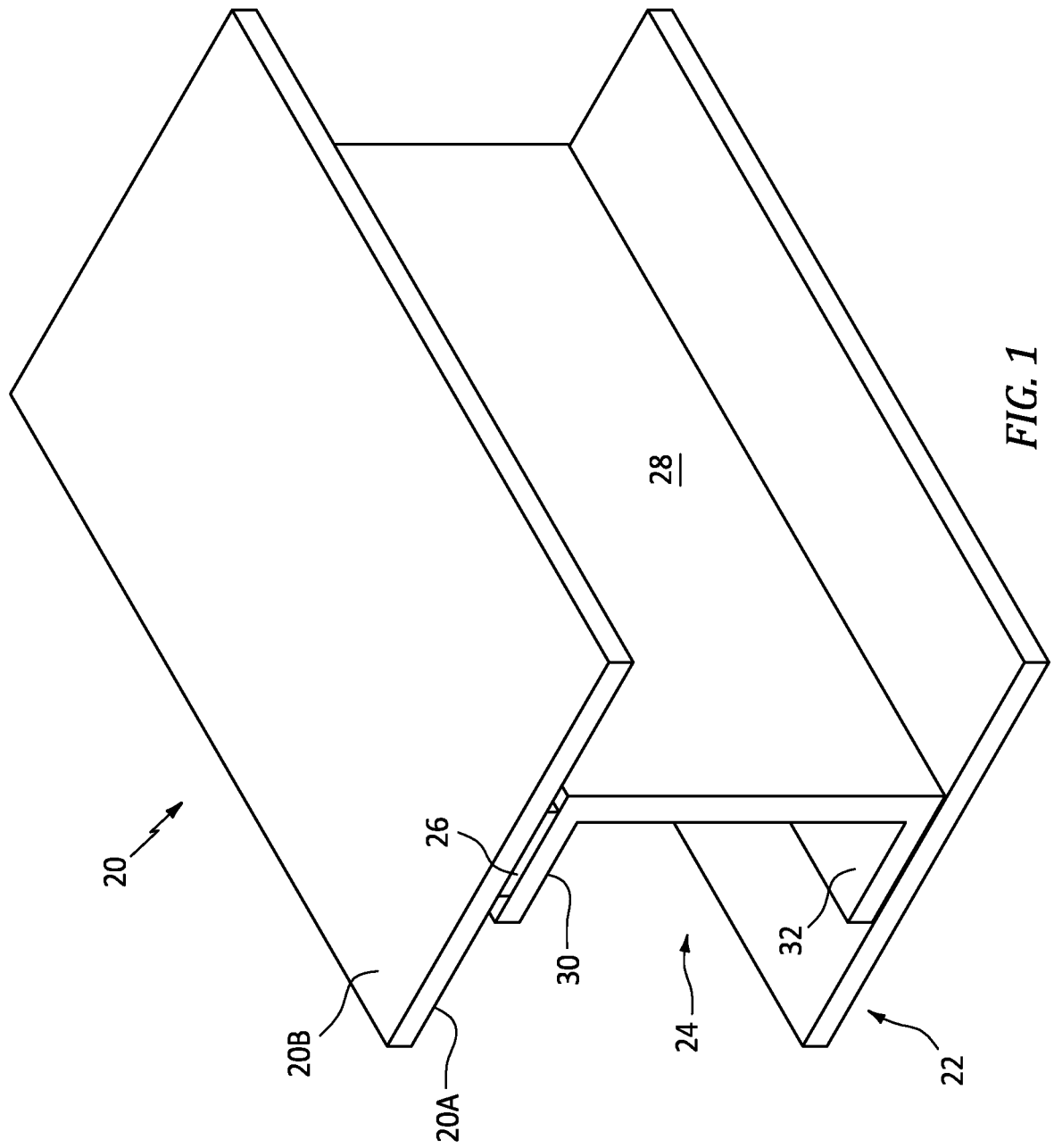
FIG. 1 is a diagrammatic view of thermoplastic components.
Figure 3:
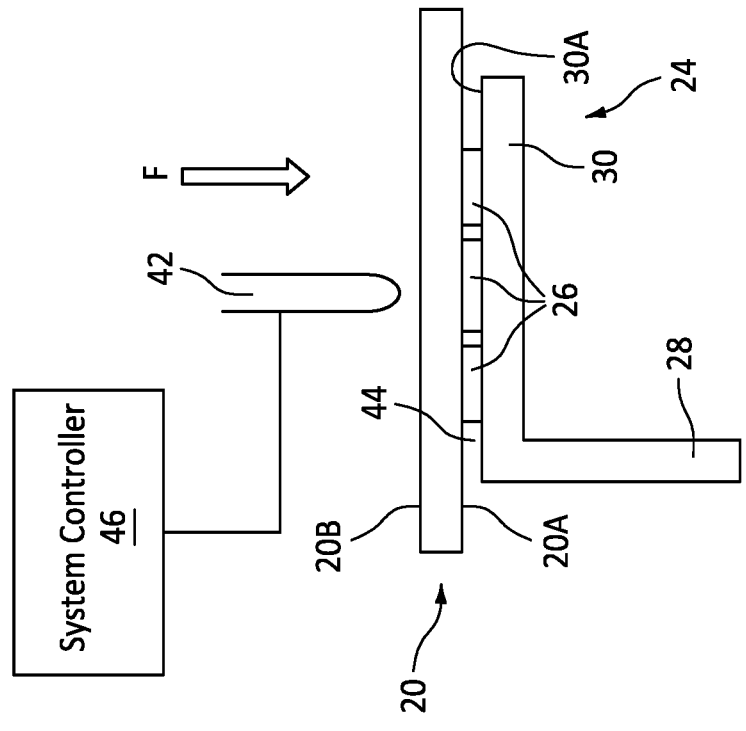
FIG. 3 is a diagrammatic view of thermoplastic components to be joined, illustrating an embodiment of the present disclosure.
Figure 2:
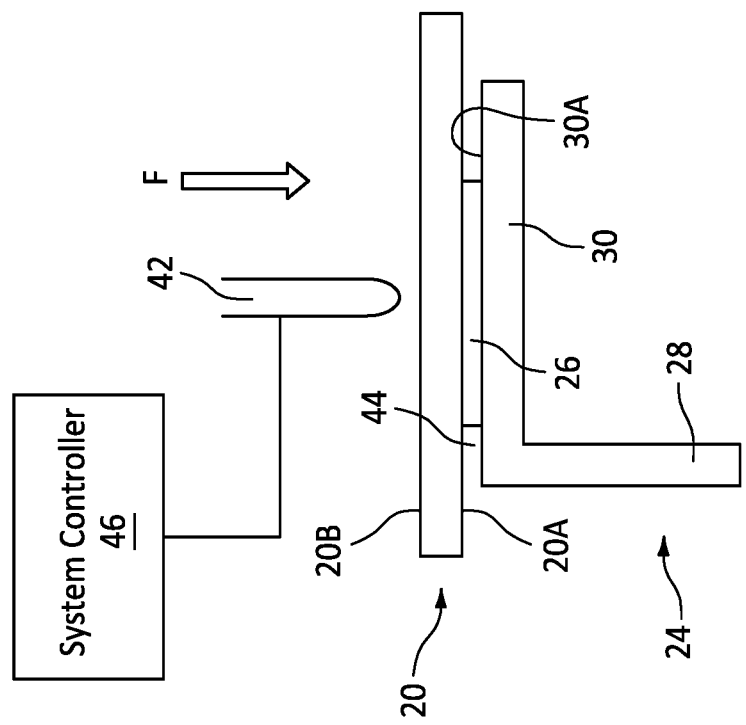
FIG. 2 is a diagrammatic view of thermoplastic components to be joined, illustrating an embodiment of the present disclosure.

FIG. 1 diagrammatically illustrates a first component panel 20, a second component panel 22, a stiffener component ("stiffener 24"), and an interface layer 26. The stiffener 24 is U-shaped and includes a web 28 extending between a first flange 30 and a second flange 32. The second component panel 22 is attached to the second flange 32 of the stiffener 24. The present disclosure will be described herein in the context of attaching (e.g., welding) the first component panel 20 to the first flange 30 of the stiffener 24. The interface layer 26 is disposed between the components to be joined; i.e., between the first component panel 20 and the first flange 30. The respective surfaces of the first component panel 20 and the first flange 30 contiguous with the interface layer 26 may be referred to herein as the bonding surfaces 20A, 30A. The first component panel 20 includes an outer surface 20B opposite the bonding surface 20A and a thickness that extends therebetween. The components 20, 22, 24 shown in FIG. 1 are provided to illustrate an example of the present disclosure and the present disclosure is not limited to joining components like those shown in FIG. 1. FIGS. 2-6 diagrammatically illustrate a portion of the first component panel 20 and the stiffener first flange 30 where the two are to be joined together in various different embodiments. The present disclosure provides considerable utility in the production of aircraft components such as, but not limited to, fins, control surfaces, stabilizers, and the like.

The present disclosure is directed to a method and system for joining components that comprise one or more thermoplastic composite (TPC) materials. Each of the components may comprise the same TPC material(s) or may comprise different TPC materials; e.g., a first component comprising a first TPC material, a second component comprising a second TPC material that is different from the first TPC material, and so on. As will be detailed herein, in some embodiments, a component may include a plurality layers of different TPC materials. Non-limiting examples of thermoplastic materials that may be included within a TPC (e.g., as a matrix material or the like) include polyaryletherketone (PAEK), polyetheretherketone (PEEK), polyetherketoneketone (PEKK), polyetherimide (PEI), perfluoroalkopxy (PFA), polytetrafluoroethylene (PTFE), polyphenylene sulfide (PPS), and polyamide (PA—"nylon"), and variations thereof.

Figure 5:
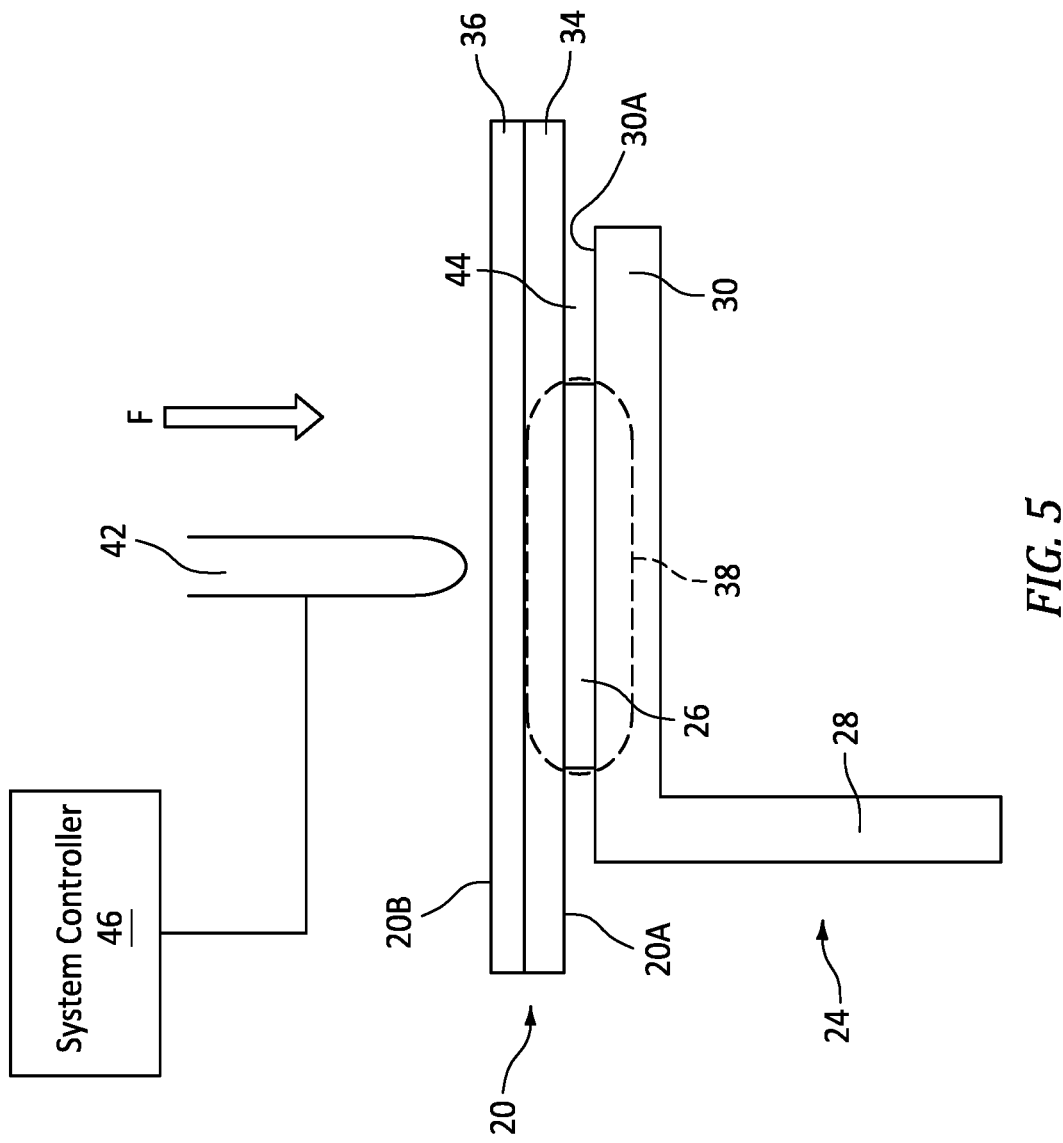
FIG. 5 is a diagrammatic view of thermoplastic components to be joined, illustrating an embodiment of the present disclosure.

In some embodiments, at least one of the components to be joined may be described as having a first region 34 contiguous with the bonding surface and a second region 36 contiguous with the outer surface (e.g., see FIG. 5, showing a first component panel 20 having a first region 34 contiguous with the bonding surface 20A and a second region 36 contiguous with the outer surface 20B). The first and second regions 34, 36 may be configured to have different responses when subjected to the same or nearly the same amount of electromagnetic (EM) energy (e.g., an EM field). The first region 34 of the component may be described as having a first EM absorbing characteristic and the second region 36 of the component may be described as having a second EM absorbing characteristic, wherein the first region 34 may be configured to absorb EM energy faster than the second region 36 absorbs EM energy, or configured to absorb a greater amount of EM energy than the second region 36. For example and again referring to FIG. 5, the first region 34 contiguous with the bonding surface 20A is configured to reach a melting temperature before the second region 36 contiguous with the outer surface 20B reaches its melting temperature when both are subjected to the same or nearly the same amount of EM energy; e.g., the first region 34 reaches its melting temperature in a period of time T1, and the second region 36 reaches its melting temperature in a period of time T2, and T1 is less than T2 (when both are subjected to the same or nearly the same amount of EM energy). In this manner, the region of the component to be joined is configured to reach its melting temperature before the region of the component contiguous with the outer surface. It is our experience that the potential for surface deformation and/or component collapse increases as the component material approaches its melting temperature. Embodiments of the present disclosure facilitate the welding process and decrease the potential for surface deformation and/or component collapse.

Figure 6:
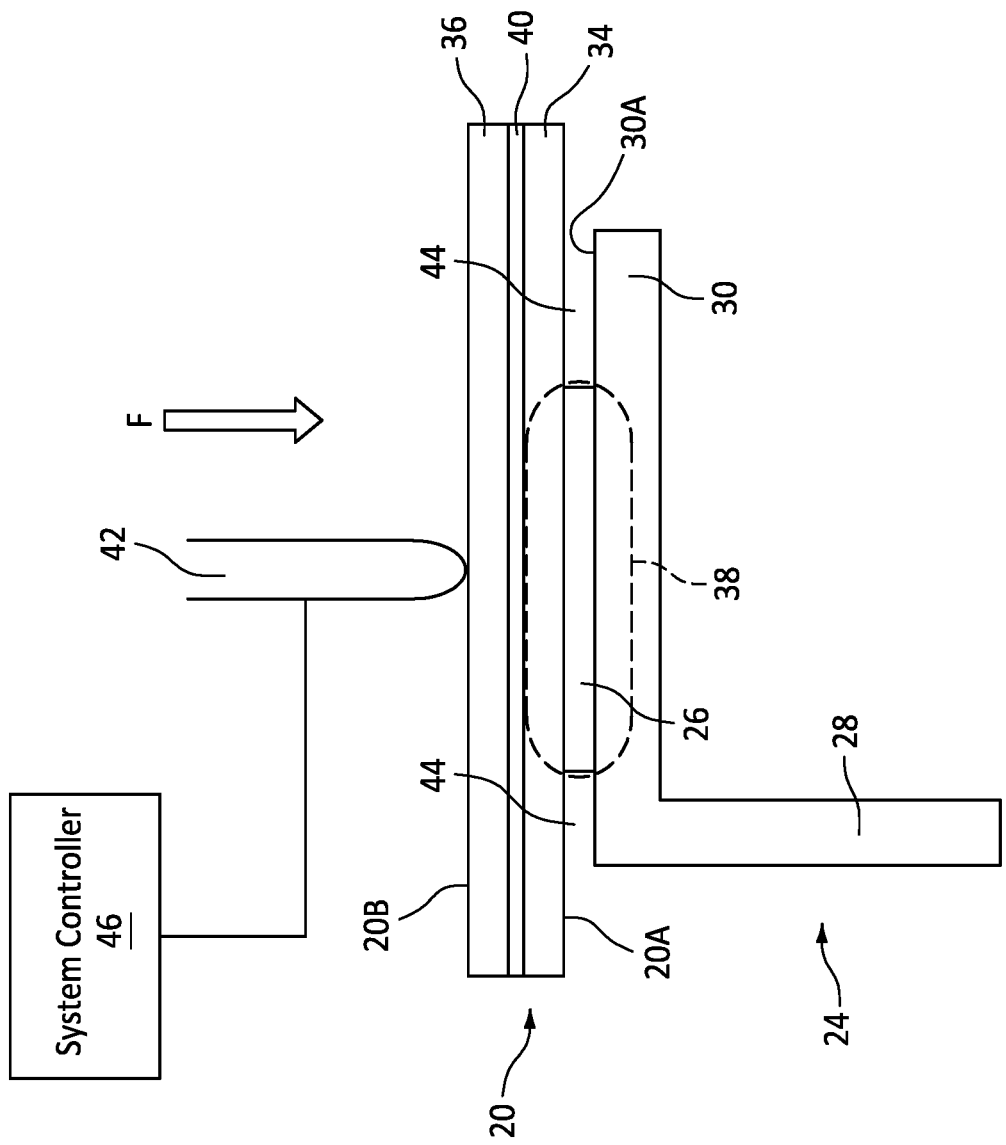
FIG. 6 is a diagrammatic view of thermoplastic components to be joined, illustrating an embodiment of the present disclosure.

Referring to FIG. 6, in some embodiments a component to be joined (e.g., first component panel 20) may include a first region 34 contiguous with the bonding surface 20A, a second region 36 contiguous with the outer surface 20B, and an isolation region 40 disposed between the first and second regions 34, 36. In these embodiments, the component to be joined may have first and second regions 34, 36 that are configured to have substantially the same response when subjected to the same or nearly the same amount of EM energy (e.g., an EM field). Alternatively, the component to be joined may have first and second regions 34, 36 that are configured to have different responses when subjected to the same or nearly the same amount of EM energy (e.g., an EM field); i.e., as described above. The isolation region 40 may be configured to function as a thermally insulative region, or configured to function as an electrically insulative region, or both. In those embodiments wherein the isolation region 40 is configured to function as a thermally insulative region, the isolation region 40 is more thermally insulative than the first region 34, and may be more thermally insulative than both the first and second regions 34, 36. In those embodiments wherein the isolation region 40 is configured to function as an electrically insulative region, the isolation region 40 may be more electrically insulative than the first region 34, or the second region 36, or both.

Figure 4:
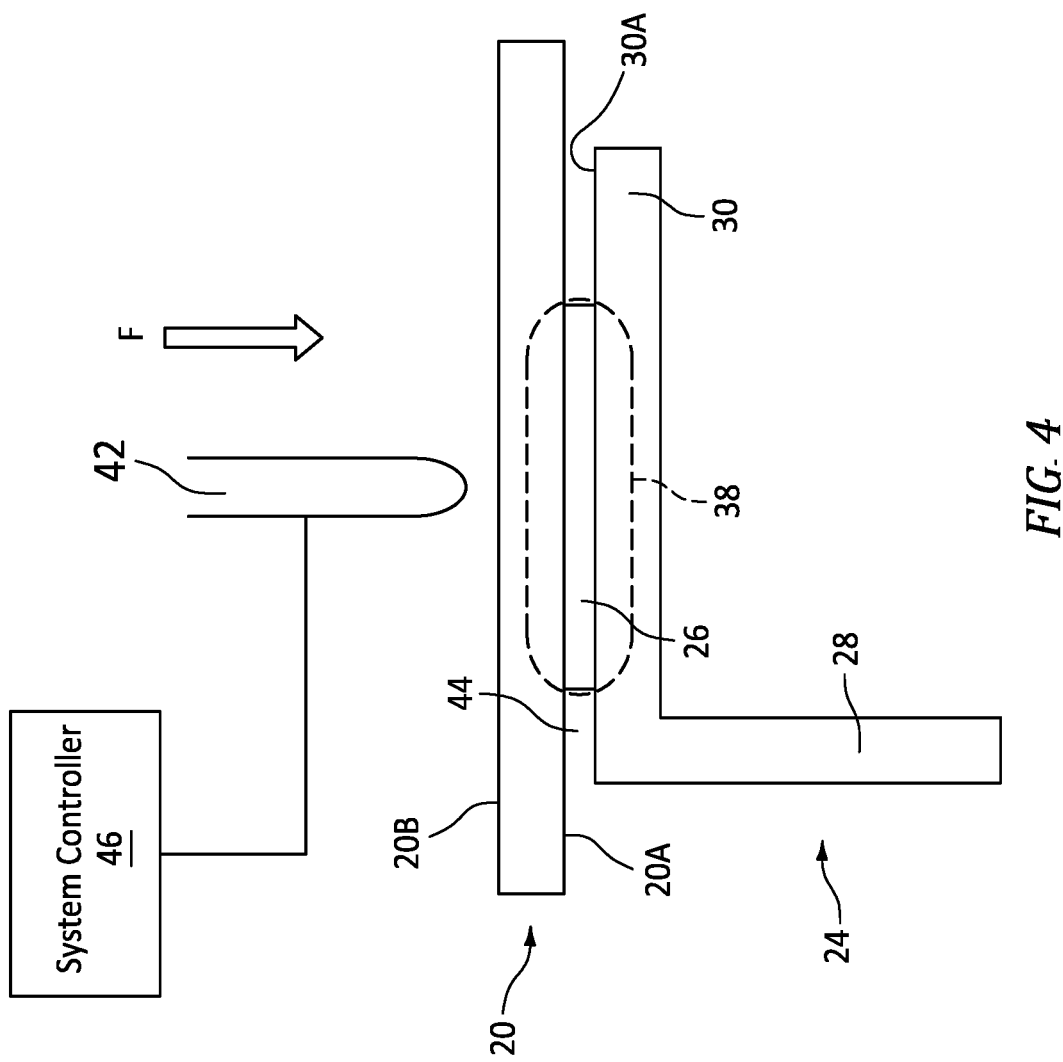
FIG. 4 is a diagrammatic view of thermoplastic components to be joined, illustrating an embodiment of the present disclosure.

The interface layer 26 is typically configured to be present solely in the region between the components where the joining of the components is desired; i.e., the "bond region" (e.g., see dashed line 38 in FIG. 4). The interface layer 26 may be a single (i.e., unitary) body that is disposed throughout the bond region (e.g., see FIG. 2), or it may be a plurality of independent segments (e.g., strips) disposed within the bond region (e.g., see FIG. 3). In some embodiments, the interface layer 26 (as a unitary body or collectively as a plurality of strips) may be configured to occupy all or substantially all of the bond region prior to the joining process. In some embodiments, the interface layer 26 (as a unitary body or collectively as a plurality of strips) may be configured to occupy the all the bond region after the joining process. The interface layer 26 comprises at least one type of thermoplastic material. The interface layer 26 may have a homogenous configuration (e.g., the same thermoplastic material throughout), or it may include a fibrous material distributed within a thermoplastic material matrix (e.g., discontinuous fibers), or it may include a plurality of sublayers with different materials. A non-limiting example of an interface layer 26 with a plurality of sub-layers is one that includes a sub-layer comprising a mesh material, or a cloth material, or a screen material, or a layer of continuous fibers, or the like. The aforesaid fibrous material or sub-layer material may be electrically conductive, but is not required to be electrically conductive. Non-limiting examples of fiber material include ceramic, glass, metal, carbon, and the like. A non-limiting example of a screen material is one comprising a metallic material. In those embodiments wherein the interface layer 26 does include an electrically conductive material (e.g., carbon fibers, carbon fiber mesh, metallic screen, and the like), the interaction of the EM field with the aforesaid electrically conductive material may expedite the production of a weld pool.

The present disclosure utilizes an induction welding process that uses a source of electromagnetic (EM) energy (referred to hereinafter as an "inductor 42") to selectively subject the components to be joined to an EM field. The EM field interacting with the components 20, 26, 30 results in a thermal response within the components that elevates the temperature of the component portions to be joined. At the elevated temperature, portions of the components melt to produce a "weld pool" of component material. As the weld pool of material cools to a temperature below the melting temperature, the weld pool of material resolidifies and the components are joined; i.e., welded. The operating parameters of the inductor 42 (e.g., voltage, power, frequency, and the like) may be controlled to produce an EM field that is appropriate for joining the particular thermoplastic composite components; i.e., different operating parameters may be used for different thermoplastic composite materials, component configurations, and the like. In some embodiments, the inductor 42 may be configured to produce the requisite EM field throughout the bond region without relative movement between the components to be joined and the inductor 42; i.e., the inductor 42 and components remain static. In other embodiments, the present disclosure system may be configured to move the inductor 42 relative to the bond region to enable application of the EM field to all portions of the bond region, or the present disclosure system may be configured to move the components (and therefore the bond region) relative to the inductor 42 to enable application of the EM field to all portions of the bond region.

The present disclosure is configured to apply a force to one of the components to be joined during the welding process. The present disclosure contemplates several different mechanisms (i.e., force actuators) for applying the force to the component (e.g., first component panel 20). For example, in some embodiments force may be applied using a mechanical structure; e.g., a roller independent of the inductor 42. As another example, force may be applied using the inductor 42. The force may be applied as a point load (e.g., applied over a contact area relatively small in comparison to the area of bond region) or may be applied as a distributed load (e.g., applied uniformly over substantially all of the area of the bond region). In the FIGURES, the inductor 42 is diagrammatically shown as the force actuator, but the present disclosure is not limited thereto.

As stated above, prior art induction welding typically utilizes force applied to both sides of the components being joined to create a weld path and material collapse therein; e.g., a force applied to the outer surface 20B of the first component panel 20 and an opposing force applied to the side of the stiffener first flange 30 opposite the first flange bonding surface 30A. In those instances where it is not possible to apply force to both sides of the components to be joined (a "blind weld") there is often a greater chance of component collapse and/or excessive component deformation (e.g., resulting from excessive component melting) using prior art methods.

The present disclosure is configured to produce the appropriate amount of thermal energy necessary to create a weld pool at the bond region, and less thermal energy in component regions adjacent to the bond region, as well as an application of force from one side of the components to be joined. Using the components shown in FIG. 4 as a specific example, the present disclosure is configured to use the inductor 42 to provide an EM field that produces the appropriate amount of thermal energy necessary to create a weld pool within a bond region (diagrammatically indicated by the dashed line 38) that includes a portion of the first component panel 20, the interface layer 26, and a portion of the first flange 30 of the stiffener 24. The air disposed in the separation gap 44 (between the first component panel 20 and the first flange 30) adjacent to the sides of the interface layer 26 is a poor conductor of thermal energy. The interface layer 26, in contrast, increases in temperature as a result of the EM field application. Hence, the interface layer 26 is understood to act as a conduit of thermal energy with the first flange 30 of the stiffener 24. In this manner, a region of the first flange 30 where bonding is desired (i.e., aligned with the interface layer 26) is understood to reach the requisite melting temperature faster than adjacent regions of the first flange 30, thereby reducing the chance of component collapse and/or excessive component deformation. In addition to the beneficial thermal path associated with the interface layer 26, the interface layer 26 also facilitates intimate contact between the components 20, 26, 30. As indicated above, the present disclosure includes an application of force to the first component panel 20. During the bonding process, the application of force to the first component panel 20 causes the melted interface layer 26 to collapse between the first component panel 20 and the first flange 30. As a result, the probability of intimate contact between the interface layer 26 and the first component panel 20 and between the interface layer 26 and the first flange 30 is increased. This aspect is particularly beneficial in those instances when component tolerances and/or surface irregularities may otherwise compromise the bonding process.

As stated above, in some embodiments a component to be joined (e.g., the first component panel 20 as shown in FIG. 5) includes a first region 34 and a second region 36 that are configured to have different responses when subjected to the same or nearly the same amount of EM energy (e.g., an EM field); e.g., a first region 34 contiguous with the bonding surface 20A that is configured to reach a melting temperature before a second region 36 contiguous with the outer surface 20B reaches its melting temperature when both are subjected to the same or nearly the same amount of EM energy. In these embodiments, the creation of a weld pool in the bonding region may be facilitated by the faster melting first region 34. At the same time, the relatively lesser response to the EM field by the second region 36 helps to prevent or mitigate the potential for deformation of the exposed outer surface 20B of the component 20. The combination of the interface layer 26 and the first region 34 of the first component panel 20 is understood to produce an improved bond between the components; e.g., the first component panel 20 and the first flange 30.

As stated above, in some embodiments a component to be joined (e.g., the first component panel 20 as shown in FIG. 6) includes a first region 34 (contiguous with the bonding surface 20A) and a second region 36 (contiguous with the outer surface 20B), separated from one another by an isolation region 40. The isolation region 40 may be configured to function as a thermally insulative region, or configured to function as an electrically insulative region, or both.

In these embodiments, the creation of a weld pool in the bonding region may be facilitated by the isolation region 40. The isolation region 40 (configured to function as a thermally insulative region, or an electrically insulative region, or both) functions to separate the thermal responses of the first region 34 and the second region 36 to the EM field. In this manner, a greater thermal response in the first region 34 (e.g., faster melting than the second region 36) is separated from the thermal response in the second region 36. The isolated response to the EM field by the second region 36 may prevent or mitigate the potential for deformation of the exposed outer surface 20B of the component (e.g., first component panel 20). The isolation region 40 may be particularly beneficial in those instances wherein the first region 34 and the second region 36 are configured to have different responses when subjected to the same or nearly the same amount of EM energy (e.g., an EM field); e.g., the first region 34 configured to reach a melting temperature before the second region 36 when both are subjected to the same or nearly the same amount of EM energy.

According to an aspect of the present disclosure, a method of monitoring the welding process between the components (e.g., first component panel 20 and stiffener first flange 30) is provided. In these embodiments, the present disclosure system may include the inductor 42 as detailed herein, a system controller 46, and sensors (e.g., pressure sensor, temperature sensor, and the like). In some embodiments, the system may include a visual display device (not shown) configured to display information related to the bonding process as will be described herein.

The system controller 46 is in communication with other components within the system, such as the inductor 42 and the sensors. In those embodiments that include a display device, the system controller 46 is also in communication with the display device. The system controller 46 may be in communication with these components to control and/or receive signals therefrom to perform the functions described herein. The system controller 46 may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the system to accomplish the same algorithmically and/or coordination of system components. The system controller 46 includes or is in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. The system controller may include, or may be in communication with, an input device that enables a user to enter data and/or instructions, and may include, or be in communication with, an output device configured, for example to display information (e.g., a visual display device as indicated above or a printer), or to transfer data, etc. Communications between the system controller 46 and other system components may be via a hardwire connection or via a wireless connection.

Figure 7:
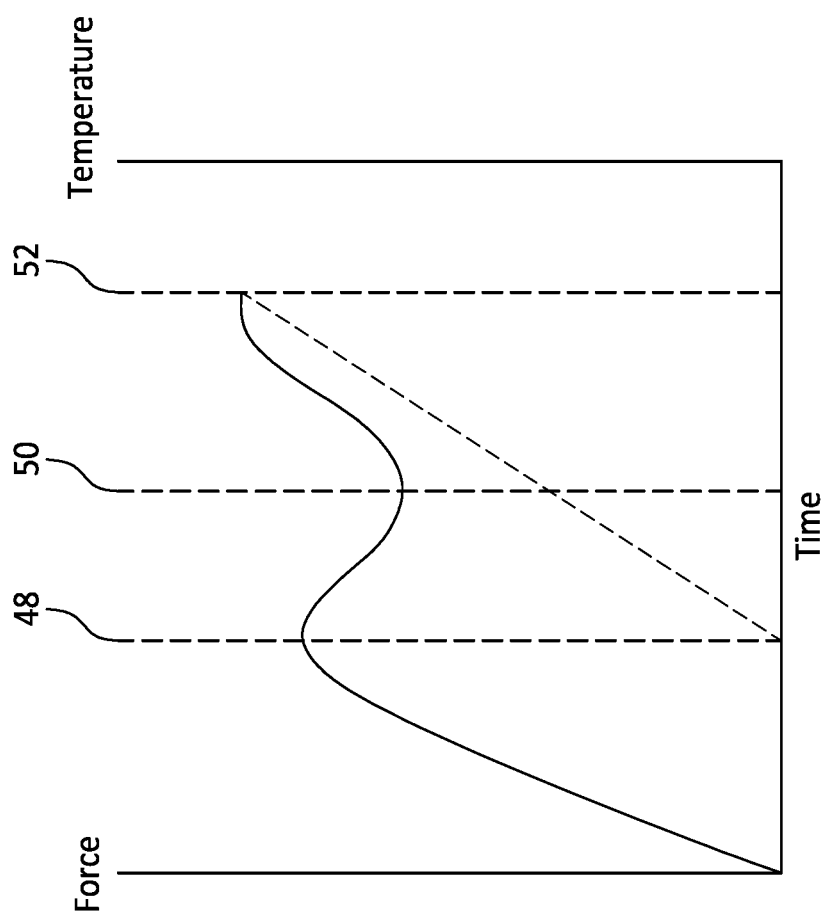
FIG. 7 is a graph of force versus time, diagrammatically illustrating present disclosure welding process data.

FIG. 7 diagrammatically illustrates a graph of force (vertical axis) versus time (horizontal axis). Temperature is also indicated on a vertical axis. The graphed data indicates a welding process start point (e.g., at the graph origin). From the start of the welding process, the applied EM field causes an increase in temperature of at least portions of the first and second component and the interface layer 26. At the same time, the amount of force applied to the first component is increased. The graphed data further indicates a first inflection point 48 indicative of a starting point of plastic deformation associated with the welding process; e.g., plastic deformation of a portion of the first component panel 20, or a portion of the first flange 30 of the stiffener 24, or the interface layer 26, or some combination thereof. The graphed data further indicates a second inflection point 50 that indicates a minimum thickness of the interface layer 26 has been achieved. At the second inflection point 50, the interface layer 26 has melted and dispersed; e.g., the interface layer 26 is in intimate contact with the bonding surfaces of the first and second components; e.g., the bonding surfaces 20A, 30A of the first component panel 20 and the first flange 30 of the stiffener 24. The data curve portion between the first and second inflection points 48, 50 is representation of the interface layer 26 melting and dispersing between the first and second components as a result of the application of the EM field by the inductor 42 and the force applied to the first component panel 20. The graphed data indicates a third point inflection 52 point wherein the sensed force plateaus. The third inflection point 52 is indicative of the welding process being completed. In some present disclosure embodiments, the data represented in the graph may be used to control the welding process; e.g., the system may be configured to recognize the inflection points 48, 50, 52. Once the data indicates that the welding process is complete, the inductor 42 may be controlled to stop producing the EM field (or at least decreasing the EM field to a level wherein no further melting of the components occurs) and the components can be allowed to cool. In this manner, the welding process of a "blind weld" can be monitored to improve weld production and consistency. The graph shown in FIG. 7 is an example (e.g., a visual example) of how data can be used to monitor the welding process. The present disclosure does not require a visual implementation of process like that shown in FIG. 7.

Figure 8:
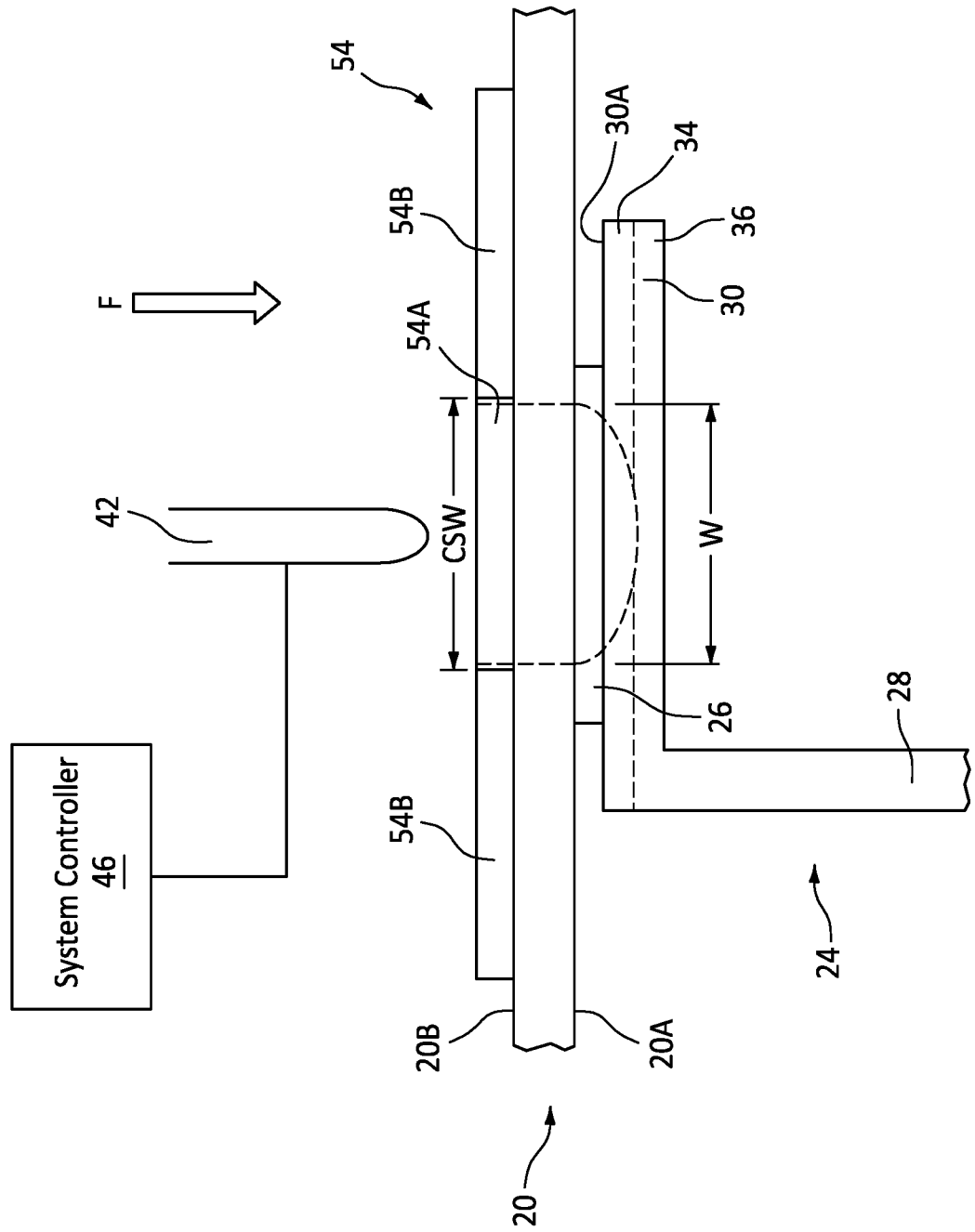
FIG. 8 is a diagrammatic view of thermoplastic components to be joined, illustrating an embodiment of the present disclosure.

Referring to FIGS. 8 and 9, some embodiments of the present disclosure include the use of an external susceptor 54 disposed relative to the outer surface of a component; e.g., disposed relative to the outer surface 20B of the first component panel 20. The external susceptor 54 is particularly useful when joining a component that is configured for lightning strike protection; e.g., that includes conductive fibers or the like. In some embodiments, the external susceptor 54 may be configured for contact with the components to be joined; e.g., to produce direct conductive heating. In some embodiments, the external susceptor 54 may be configured to be spaced apart from the components to be joined; e.g., to produce indirect radiation heating.

The external susceptor 54 includes a central segment 54A disposed between pair of lateral segments 54B arranged in a planar configuration. In some embodiments, the central segment 54A may have a geometry that substantially matches the desired bonding region of the components to be joined, including the interface layer 26. For example, in FIG. 8 the central segment 54A has a width (CSW) that is substantially equal to the width (W) of the desired bonding region of the components to be joined. In some embodiments, the central segment 54A may have a geometry that is smaller than the desired bonding region of the components to be joined. In these embodiments, the external susceptor may be moved relative to the components to be joined, or vice versa to ensure bonding occurs throughout the entirety of desired bonding region of the components. The external susceptor diagrammatically shown in FIG. 9 includes a central segment 54A having a length that extends the entirety of the external susceptor. The external susceptor diagrammatically shown in FIG. 9A includes a central segment 54A having a length that extends less than the entirety of the external susceptor; i.e., the central segment 54A is completely surrounded by the lateral segments. The present disclosure is not limited to these susceptor embodiments shown in FIGS. 9 and 9A.

The central segment 54A and lateral segments are configured to respond differently to an application of the EM field by the inductor 42. For example, the central segment 54A and lateral segments may be configured such that an application of the EM field by the inductor 42 results in the central segment 54A increasing in temperature more than the lateral segments; e.g., in an application of an EM field that causes the central segment 54A to heat to a temperature (TEMP1) that is at or slightly above the melting temperature of the component to be joined (e.g., the first component panel 20), and results in the lateral segments being heated to a temperature (TEMP2) below the melting temperature of the component to be joined (i.e., TEMP1>TEMP2). In some embodiments, the central segment 54A material may be described as having a greater permeability than the lateral segments. In some embodiments, the external susceptor may include cooled lateral segments.

The susceptor segments are configured to not bond with the component during the joining process; e.g., for those embodiments wherein the susceptor is configured to be in contact with a component to be joined, the surface of the susceptor segments intended to contact the component may include a coating or a surface treatment that inhibits bonding between the susceptor segments and the component.

In some embodiments, the external susceptor may be formed by butt welding the respective susceptor segments together to produce the planar configuration. The present disclosure is not limited to butt welding the susceptor segments; i.e., the susceptor segments may be maintained relative to one another by other means.

During operation of this aspect of the present disclosure, and using the first component panel 20, stiffener first flange 30, and interface layer 26 diagrammatically shown in FIG. 8 to illustrate, the external susceptor is disposed in contact with the outer surface 20B of the first component panel 20. The central segment 54A has a width (CSW) that substantially matches the desired bonding region of the components to be joined, including the interface layer 26. For example, in FIG. 8 the central segment 54A has a width (CSW) that is substantially equal to the width (W) of the desired bonding region of the first component panel 20, the stiffener first flange 30, and interface layer 26. A force actuator (e.g., the inductor 42) is used to apply force to the exposed surface of the external susceptor 54 and thereby apply force to the components to be joined. The inductor 42 is operated to produce an EM field adequate to heat the central segment 54A to a temperature at or above the melting temperature of the components to be joined. At the same time, the EM field produced by the inductor 42 does not cause the lateral segments 54B of the external susceptor 54 to reach the same temperature; e.g., preferably a temperature substantially less than the aforesaid component melting temperature. The thermal energy produced by the EM field in the central segment 54A propagates through the aligned portion of the first component panel 20, the interface layer 26, and a portion of the aligned stiffener first flange 30. Once the appropriate weld pool is created and the welding process is completed, the inductor 42 may be controlled to stop producing the EM field (or at least decreasing the EM field to a level wherein no further melting of the components occurs) and the components can be allowed to cool. These embodiments of the present disclosure also share in the benefits provided by the interface layer 26 and singular application of force; e.g., overcoming component tolerances and/or surface irregularities that may otherwise compromise the bonding process.

In the present disclosure embodiments that utilize an external susceptor 54, the susceptor 54 may be employed to protect/shield areas of a component that are not intended to be subjected to an EM field.

Embodiments of the present disclosure that utilize an external susceptor 54 may be combined with other aspects of the present disclosure. For example, as described above a component to be joined may include a first region contiguous with the bonding surface of a component and a second region disposed opposite the first region; e.g., a first region 34 contiguous with the bonding surface 30A of the first flange 30 of the stiffener 24 and a second region 36 disposed contiguous of the opposite outer surface of the first flange 30. In this example, the first region 34 of the first flange may have a lower melting temperature than the second region. Hence, the desired bonding/welding may occur via the conducted thermal energy and the integrity of the first flange 30 second region and the stiffener web 28 maintained. In similar fashion, the first flange 30 may include an isolation region 40 (e.g., see FIG. 6) disposed between first and second regions 34, 36, which isolation region 40 is configured to provide thermal insulation between the first flange first and second regions 34, 36, and thereby maintain the integrity of the first flange second region 36 and the stiffener web 28. In another example of the external susceptor 54 being combined with other aspects of the present disclosure, the external susceptor 54 aspect may be combined with the welding process described herein and shown in FIG. 7.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of blind welding thermoplastic composite components, comprising:

providing a first thermoplastic composite (FTPC) component having a thickness that extends between an outer surface and an opposite FTPC bonding surface, the first thermoplastic composite component having a first melting temperature;

providing a second thermoplastic composite (STPC) component having a STPC bonding surface, the second thermoplastic composite component having a second melting temperature;

providing an interface layer comprising a thermoplastic material, the interface layer having a third melting temperature;

disposing the interface layer between the FTPC bonding surface and the STPC bonding surface, such that the FTPC bonding surface is contiguous with the interface layer, and the STPC bonding surface is contiguous with the interface layer;

disposing an external susceptor adjacent to the outer surface of the first thermoplastic composite component, wherein the external susceptor includes a central segment and a plurality of lateral segments contiguous with the central segment, wherein the central segment and the plurality of lateral segments are configured to respond differently to an application of an electromagnetic field;

applying a normal force to the outer surface of the first thermoplastic composite component without an application of an opposing second normal force to the second thermoplastic component; and applying an electromagnetic field to the central segment and the plurality of lateral segments using an inductor, wherein the central segment and the plurality of lateral segments are configured such that the electromagnetic field heats the central segment to the first melting temperature or above, and heats the lateral segments to a temperature below the first melting temperature, and the electromagnetic field is applied until a region of the first thermoplastic composite component aligned with the central segment is at or above the first melting temperature, the interface layer is at or above the third melting temperature, and at least a portion of the second thermoplastic composite component is at or above the second melting temperature.

2. The method of claim 1, further comprising removing the application of the electromagnetic field after the first thermoplastic composite component aligned with the central segment is at or above the first melting temperature, the interface layer is at or above the third melting temperature, and the at least the portion of the second thermoplastic composite component is at or above the second melting temperature.

3. The method of claim 1, wherein the interface layer is a unitary body configured to occupy substantially all of a bond region between the first thermoplastic composite and the second thermoplastic composite.

4. The method of claim 3, wherein the interface layer occupies substantially all of the bond region between the first thermoplastic composite and the second thermoplastic composite subsequent to a weld pool creation.

5. The method of claim 4, wherein the thermoplastic material of the interface layer is homogenous.

6. The method of claim 4, wherein the interface layer includes a fibrous material distributed in a matrix of said thermoplastic material.

7. The method of claim 1, wherein the interface layer comprises a plurality of independent segments configured to collectively occupy substantially all of a bond region between the first thermoplastic composite and the second thermoplastic composite.

8. The method of claim 1, wherein the external susceptor has a planar configuration.

9. The method of claim 8, wherein the plurality of lateral segments includes a first lateral segment and a second lateral segment, and the central segment is disposed between the first lateral segment and the second lateral segment.

10. The method of claim 9, wherein the first lateral segment is attached to the central segment, and the second lateral segment is attached to the central segment.

11. The method of claim 1, wherein the second thermoplastic composite component includes a first region contiguous with a bonding surface and a second region contiguous with a surface opposite the bonding surface;

wherein the first region has the second melting temperature, and the second region has a fourth melting temperature higher than the second melting temperature.

12. The method of claim 11, wherein the second thermoplastic composite component further includes an isolation region disposed between the first region and the second region, and the isolation region is configured to be more thermally insulative than the first region.

13. The method of claim 1, wherein the normal force is directly applied to the outer surface of the first thermoplastic composite component.

14. The method of claim 1, wherein the normal force is applied to the external susceptor.

15. The method of claim 14, wherein the inductor is used to apply the normal force.

16. A method of welding a first thermoplastic composite component to a second thermoplastic composite component, wherein the first thermoplastic composite (FTPC) component has a thickness that extends between an outer surface and an opposite FTPC bonding surface, and the second thermoplastic composite (STPC) component has a STPC bonding surface, wherein an interface layer is disposed between the FTPC bonding surface and the STPC bonding surface, the method comprising:

disposing an external susceptor adjacent to the outer surface of the first thermoplastic composite component;

applying a normal force to the outer surface of the first thermoplastic composite component without an application of an opposing second normal force to the second thermoplastic component;

applying an electromagnetic field to the external susceptor while the normal force is applied, the applied electromagnetic field configured to create a weld pool that encompasses a portion of the first thermoplastic composite component, a portion of the second thermoplastic composite component, and the interface layer;

determining a first inflection point of the applied normal force, a second inflection point of the applied normal force, wherein the applied normal force decreases between the first inflection point and the second inflection point, and a third inflection point whereafter the applied normal force becomes substantially constant; and removing the applied electromagnetic field to permit the weld pool to solidify upon determining the third inflection point.

17. The method of claim 16, wherein the normal force is directly applied to the outer surface of the first thermoplastic composite component.

18. The method of claim 16, wherein the normal force is applied to the external susceptor.

19. The method of claim 18, wherein an inductor is used to apply the normal force.

* * * * *